US008683471B2

(12) United States Patent
Brent et al.

(10) Patent No.: US 8,683,471 B2
(45) Date of Patent: Mar. 25, 2014

(54) HIGHLY DISTRIBUTED PARALLEL PROCESSING ON MULTI-CORE DEVICE

(75) Inventors: Jason B. Brent, Foothill Ranch, CA (US); Nour Toukmaji, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 550 days.

(21) Appl. No.: 12/657,406

(22) Filed: Jan. 19, 2010

(65) Prior Publication Data

US 2010/0131955 A1    May 27, 2010

Related U.S. Application Data

(63) Continuation-in-part of application No. 12/313,561, filed on Nov. 20, 2008.

(60) Provisional application No. 61/195,076, filed on Oct. 2, 2008.

(51) Int. Cl.
*G06F 9/46* (2006.01)

(52) U.S. Cl.
USPC ............................ 718/102; 718/104; 718/105

(58) Field of Classification Search
USPC .................................. 718/100, 102, 104, 105
See application file for complete search history.

(56) References Cited

U.S. PATENT DOCUMENTS

| | | | |
|---|---|---|---|
| 6,434,590 B1* | 8/2002 | Blelloch et al. | 718/102 |
| 8,205,205 B2* | 6/2012 | Franke | 718/103 |
| 2003/0149716 A1 | 8/2003 | Peterson | |
| 2004/0054998 A1* | 3/2004 | Hayashi | 718/102 |
| 2004/0139286 A1* | 7/2004 | Lin et al. | 711/151 |
| 2005/0210472 A1* | 9/2005 | Accapadi et al. | 718/105 |
| 2005/0246340 A1* | 11/2005 | Smith | 707/9 |
| 2006/0123423 A1* | 6/2006 | Brenner | 718/105 |
| 2007/0033592 A1 | 2/2007 | Roediger | |
| 2007/0113231 A1* | 5/2007 | Honmura | 718/100 |
| 2008/0235698 A1* | 9/2008 | Bansal et al. | 718/103 |
| 2008/0288946 A1* | 11/2008 | Richards et al. | 718/103 |
| 2009/0106767 A1* | 4/2009 | Buckler | 718/105 |
| 2009/0150888 A1* | 6/2009 | Ye et al. | 718/102 |
| 2010/0185833 A1* | 7/2010 | Saito et al. | 712/203 |

OTHER PUBLICATIONS

Ahmad, et al.: "DPS: dynamic priority scheduling heuristic for heterogeneous computing systems" IEE Proceedings: Computers and Digital Techniques, IEE, GB, vol. 145, No. 6, Nov. 19, 1998, pp. 411-418.

(Continued)

*Primary Examiner* — Diem Cao
(74) *Attorney, Agent, or Firm* — Farjami & Farjami LLP

(57) ABSTRACT

There is provided a highly distributed multi-core system with an adaptive scheduler. By resolving data dependencies in a given list of parallel tasks and selecting a subset of tasks to execute based on provided software priorities, applications can be executed in a highly distributed manner across several types of slave processing cores. Moreover, by overriding provided priorities as necessary to adapt to hardware or other system requirements, the task scheduler may provide for low-level hardware optimizations that enable the timely completion of time-sensitive workloads, which may be of particular interest for real-time applications. Through this modularization of software development and hardware optimization, the conventional demand on application programmers to micromanage multi-core processing for optimal performance is thus avoided, thereby streamlining development and providing a higher quality end product.

20 Claims, 3 Drawing Sheets

(56) References Cited

OTHER PUBLICATIONS

Sibai, Fadi N.: "Nearest Neighbor Affinity Scheduling in Heterogeneous Multi-Core Architectures" Journal of Computer Science and Technology, vol. 8, No. 3, Oct. 2008, pp. 144-150.

Augonnet, et al: "StarPU: A Unified Platform for Task Scheduling on Heterogeneous Multicore Architectures", Euro-Par 2009 Parallel Processing, Springer Berlin Heidelberg, Berlin, Heidelberg, vol. 5704, Aug. 25, 2009, pp. 863-874.

Shelepov, et al: "HASS: a scheduler for heterogeneous multicore systems" Operating Systems Review ACM USA, vol. 43, No. 2, Apr. 2009 pp. 66-75.

* cited by examiner

HIGHLY DISTRIBUTED PARALLEL PROCESSING ON MULTI-CORE DEVICE

RELATED APPLICATIONS

This application is a continuation-in-part of U.S. patent application Ser. No. 12/313,561 filed Nov. 20, 2008, which claims priority from U.S. Provisional Application No. 61/195,076, filed Oct. 2, 2008, which are hereby incorporated by reference in their entirety.

BACKGROUND OF THE INVENTION

1. Field of the Invention

The present invention relates generally to processing systems, and more specifically to multi-core processing systems.

2. Background Art

In the past, increasing performance in processing-intensive electronic devices, such as base transceiver stations and other types of communications devices, could be achieved merely by increasing the processor clock speed of the devices. However, the introduction of applications requiring very fast processing performance to meet application latency requirements, such as Voice over Internet Protocol (VoIP), video conferencing, multimedia streaming, and other real-time applications have rendered this simple approach as no longer practical. As a result, the use of highly distributed multi-core systems with several general and custom DSPs has become a popular approach for increasing performance in processing-intensive electronic devices, such as wireless base station transceivers. To realize the potential increase in performance that multiple processing cores can provide, however, each processing core needs to be programmed so that the processing workload is appropriately divided over the numerous processing cores.

However, programming multiple processing cores can be significantly more complicated than programming a single core, placing a heavy burden on programmers. To avoid this burden, many software development paradigms are still focused on sequentially organized single-core applications. As a result, development tools are often not well suited to programming for multi-core systems. In order to efficiently utilize multiple cores, programmers have thus been traditionally required to understand the low-level hardware implementation details for the multi-core system to be programmed, manually specifying intra-cores communication, task delegation, and other hardware details. Programmers may find it difficult to adhere to application development budgets and schedules with this extra burden, leading to software applications that may be poorly optimized for use on multi-core hardware systems.

Accordingly, there is a need in the art for a multi-core system that can effectively address the aforementioned difficulty of programming, facilitating development and optimizing of software for multi-core systems.

SUMMARY OF THE INVENTION

There is provided a highly distributed multi-core system with an adaptive scheduler, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
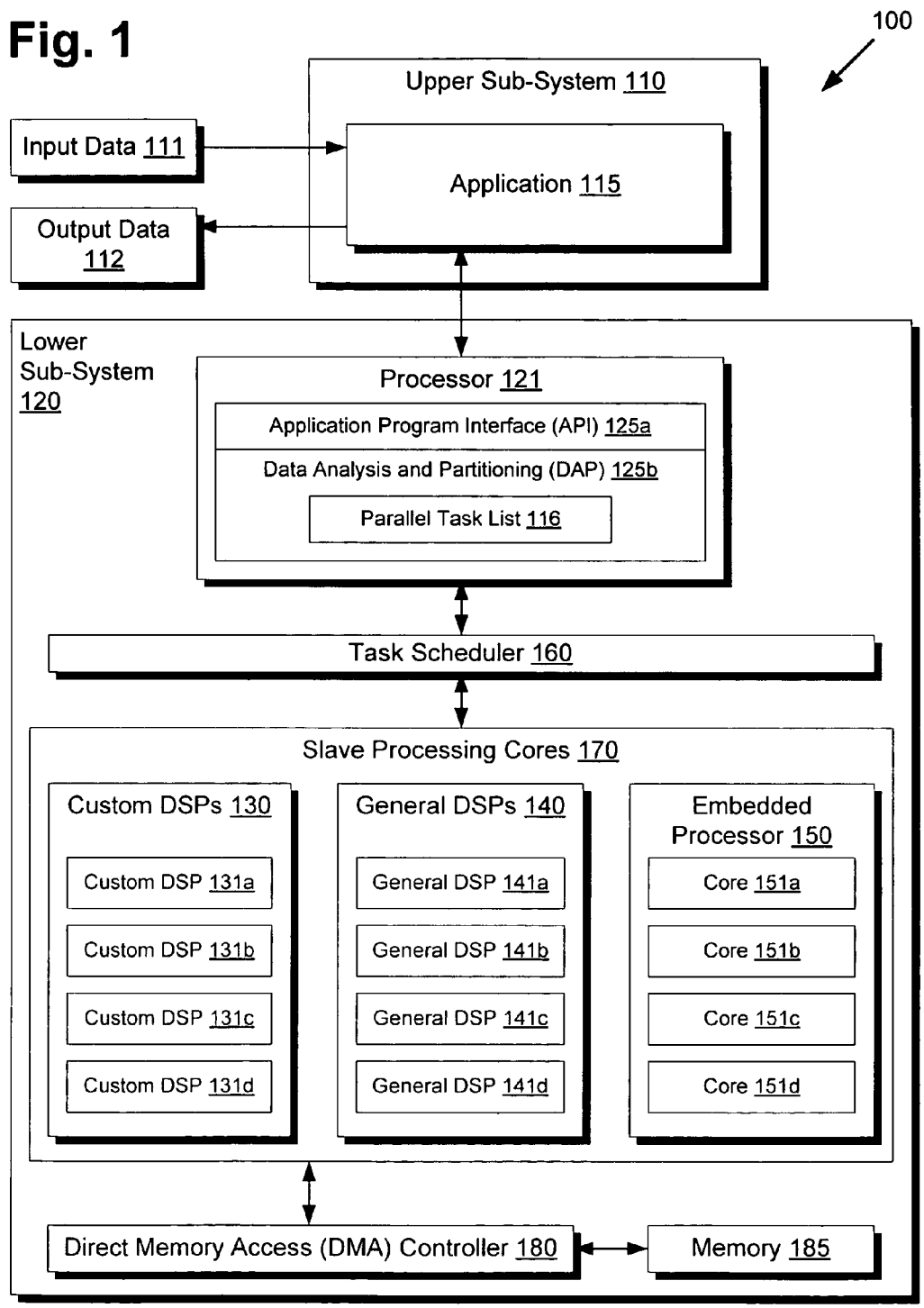
FIG. 1 shows a diagram of an exemplary multi-core system with an adaptive scheduler, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary multi-core system with an adaptive scheduler, according to one embodiment of the present invention. Multi-core system 100 of FIG. 1 includes upper sub-system 110 containing application 115. Application 115 may be executing on an upper processor (not shown), which may also execute an operating system and operating system programs. Application 115 may be written to process input data 111, which may be updated in real-time. Input data 111 may be received from, for example, an Ethernet network interface. Upon processing of input data 111, output data 112 may be generated and sent through another interface, such as a radio broadcast interface. Thus, an example application 115 may receive input data 111 as a digitized voice stream for encoding to output data 112 as a compressed and encrypted data stream for transmission via a wireless radio broadcast.

As shown in FIG. 1, upper sub-system 110 is in communication with processor 121 of lower sub-system 120 through application program interface (API) 125a, which provides well-defined communication protocols for exchanging data between the upper and lower sub-systems. Using data analysis and partitioning (DAP) 125b executing on processor 121, application 115 can pass input data 111 and direct the generation of parallel task list 116 for execution on lower sub-system 120. The contents of parallel task list 116 may be constructed depending on the tasks necessary to execute on input data 111, which may change in real-time. After such data-driven construction, parallel task list 116 may be passed to task scheduler 160, which may choose a subset of tasks to execute from parallel task list 116 based on specified priorities, with the remaining tasks deferred for later execution. Task scheduler 160 may also impose its own overriding priorities based on hardware restraints or other limitations. After the subset of tasks is chosen, it may then be distributed to slave processing cores 170 for execution.

As shown in FIG. 1, slave processing cores 170 may include several different types of processing cores. Custom digital signal processors (DSPs) 130 include custom DSPs 131*a*-131*d*, which may have limited instruction sets optimized for specific processing patterns. General DSPs 140 include general DSPs 141*a*-141*d*, which may have broader instruction sets than custom DSPs 130 but still be primarily optimized for specific processing patterns. These specific processing patterns might include working with particular data-types, such as floating point numbers, or specific processing operations, such as turbo/viterbi decoding, fast Fourier transforms (FFT/IFFT), matrix inversion and other specialized algorithms. Embedded processor 150 includes cores 151*a*-151*d*, which may comprise a multi-core reduced instruction set computer (RISC) supporting more general processing duties. As shown in FIG. 1, slave processing cores 170 may access a shared memory 185 using direct memory access (DMA) controller 180. Additionally, although omitted from FIG. 1, each DSP and core may have access to local memory as well.

While only four of each type of slave processing core is shown in FIG. 1, alternative embodiments may use any number and type of slave processing cores. Furthermore, as the diagram shown in FIG. 1 is presented as a high level overview, implementation details have been simplified or omitted for reasons of clarity.

Figure 2:
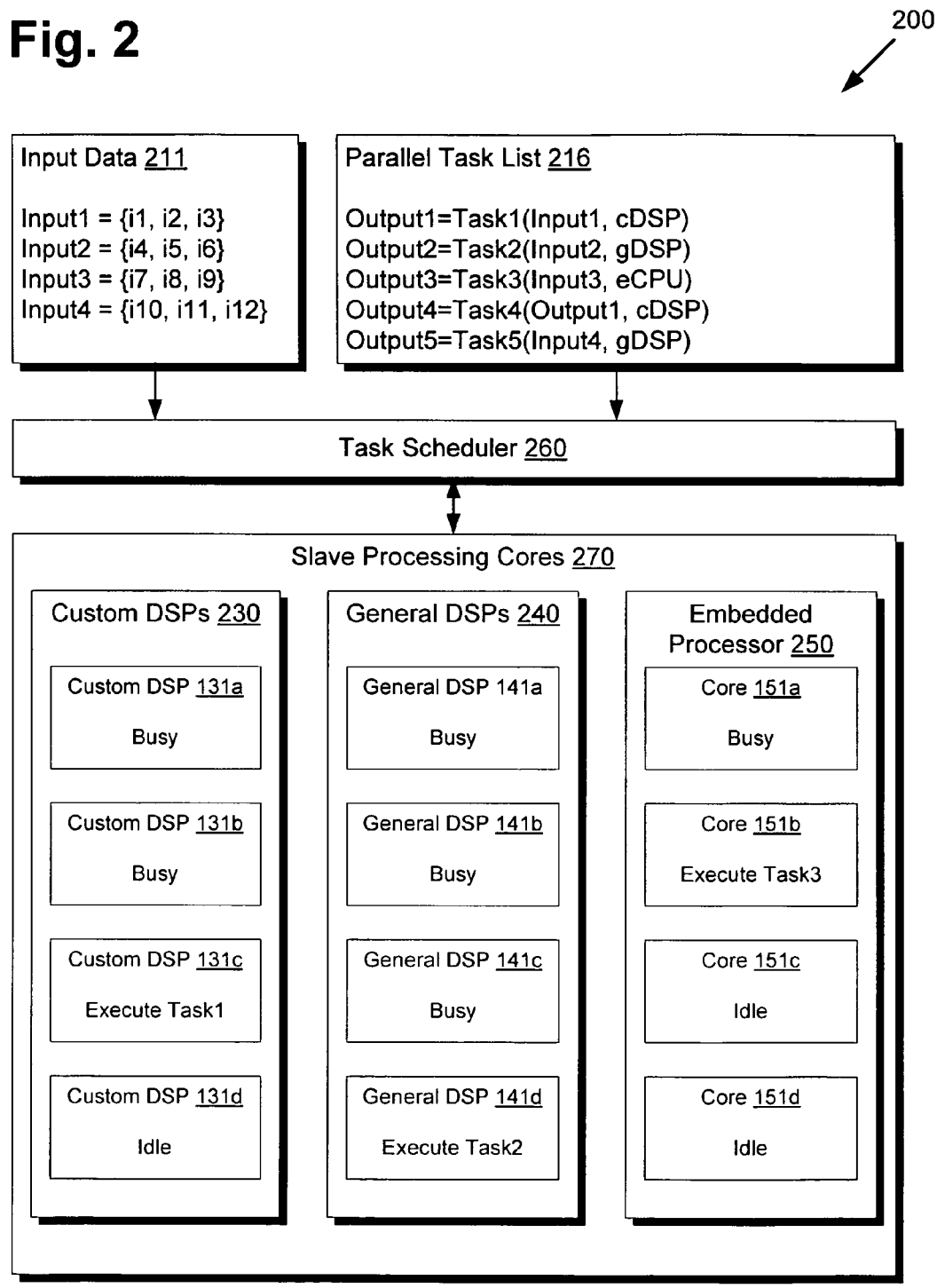
FIG. 2 shows a diagram showing the distribution of tasks by an adaptive scheduler, according to one embodiment of the present invention.

Moving to FIG. 2, FIG. 2 shows a diagram showing the distribution of tasks by an adaptive scheduler, according to one embodiment of the present invention. Diagram 200 of FIG. 2 includes input data 211 containing the inputs as shown, with Input1 including {i1, i2, i3}, Input2 including {i4, i5, i6}, Input3 including {i7, i8, i9} and Input4 including {i10, i11, i12}. Input data 211 may be updated in real-time, varying in size and number of inputs to reflect changing user workloads and load patterns. The tasks labeled Task1, Task2, Task3, Task4, and Task5 in parallel task list 216 are programmed to process input data 211, and may be ordered in descending priority by the programmer, with Task1 as the highest priority and Task5 as the lowest priority. Additionally, as shown in parallel task list 216, each task may be assigned a preferred core type for optimal execution. Thus, Task1 and Task4 are specified to run on custom DSPs 230, Task 2 and Task 5 are specified to run on general DSPs 240, and Task 4 is specified to run on embedded processor 250.

While the priorities and core affinities provided by the programmer generating parallel task list 216 may be used as base guidelines for task scheduler 260, task scheduler 260 may also override these preferences to better meet hardware scheduling constraints or address other low-level hardware implementation details. Thus, task scheduler 260 may reassign priorities based on, for example, preventing buffer underruns or other undesirable states in memory, optimizing core usage, providing greater data locality, and applying other optimizations that may be difficult and tedious for a programmer to implement without having intimate low-level knowledge of slave processing cores 270.

As a general case and for ease of implementation, task scheduler 260 may first access and analyze parallel task list 216 based on data dependencies. Thus, the data inputs for each task listed in parallel task list 216 may be analyzed, and only tasks with independently accessible data inputs may be selected for processing in a present time frame. For example, examining parallel task list 216, since Task4 depends on Output1 of Task1 as a data input, it may be classified as a data dependent task and therefore deferred until Output1 is available. Since the remaining selected tasks now have independent data inputs, they may be executed in a highly parallel fashion.

Task scheduler 260 may then analyze the state of slave processing cores 270 to determine free cores to distribute tasks. As shown in FIG. 2, some cores are already in the Busy state, which may indicate that the cores are locked from previously assigned processes and are presently unavailable. Thus, general DSPs 240 only has one free general DSP 141*d* available, which is assigned to Task2 having a higher priority than Task5. Thus, Task5 is deferred for execution in a future time frame.

Alternatively, task scheduler 260 may reassign Task5 to a different core. As shown in FIG. 2, even after assigning Task3 to core 151*b*, embedded processor 250 still has cores 151*c*-151*d* remaining idle. Thus, while embedded processor 250 may be less optimized for Task5 than general DSPs 240, as indicated by the core preferences provided by the application programmer, it may be desirable to move Task5 to core 151*c* or core 151*d* to optimize usage of available cores. Alternatively, if custom DSPs 230 provide flexible enough instruction sets, Task5 may be translated for execution on custom DSP 131*d*, which is also shown as idle. In this manner, wasted cycles from idle cores may be avoided.

On the other hand, task scheduler 260 may opt to avoid reassigning tasks to better align with the core affinity recommendations of parallel task list 216. This determination might also be aided by the use of simulations and code tracing to provide task scheduler 260 with predictive code analysis capabilities. Thus, task scheduler 260 may recognize patterns of tasks that may follow particular task lists, allowing conservative allocation of tasks to prepare for heavy processing requirements or aggressive allocation of tasks in anticipation of a light workload. In this manner, the programmer can specify preferred priorities from a high-level software perspective, whereas the designer of task scheduler 260 can flexibly adapt, reject, or modify the provided priorities based on competing low-level hardware requirements of slave processing cores 270 and other system components.

Figure 3:
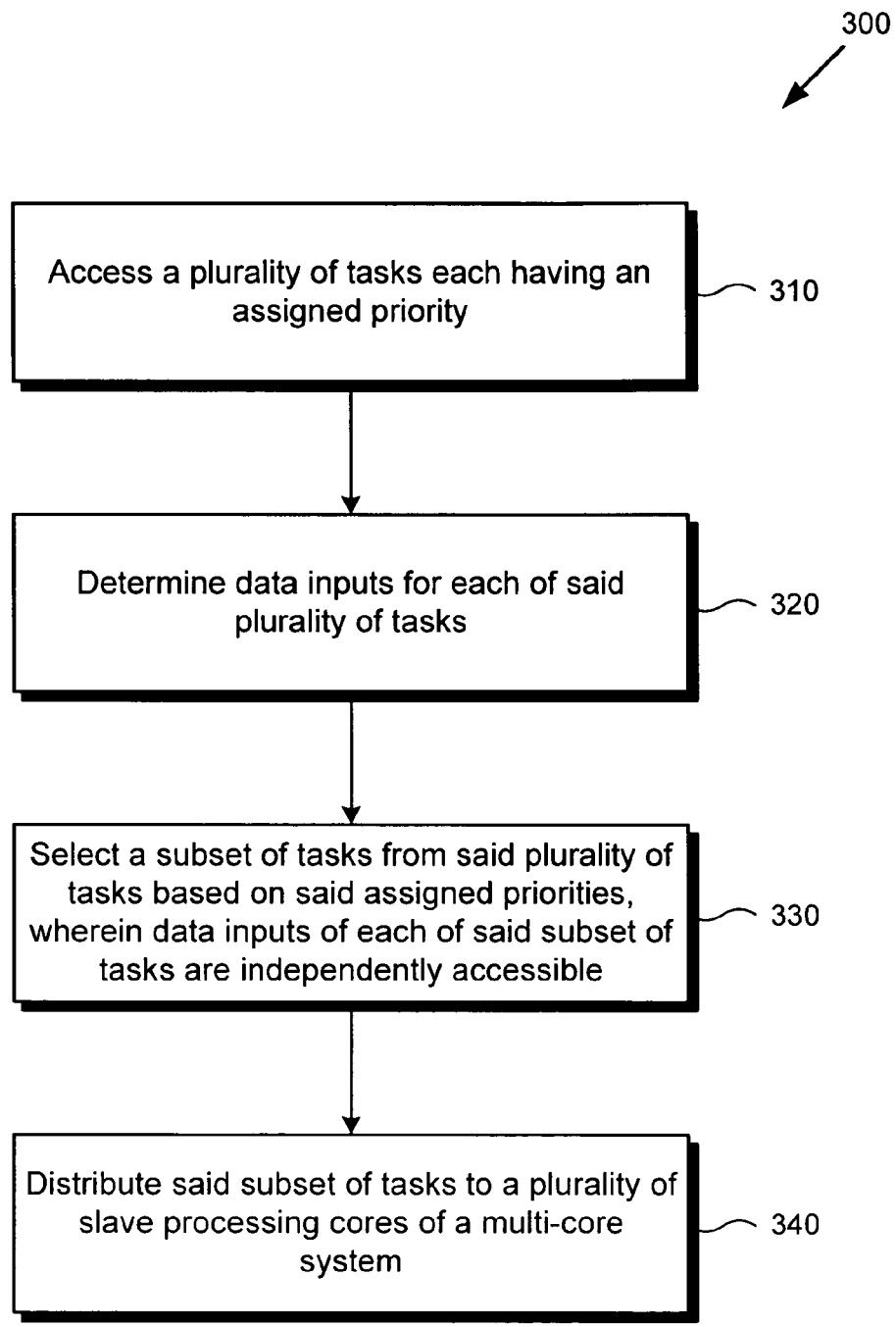
FIG. 3 is a flowchart presenting a method for an adaptive scheduler to distribute tasks for execution on a multi-core system, according to one embodiment of the present invention.

FIG. 3 is a flowchart presenting a method for an adaptive scheduler to distribute tasks for execution on a multi-core system, according to one embodiment of the present invention. Certain details and features have been left out of flowchart 300 of FIG. 3 that are apparent to a person of ordinary skill in the art. For example, a step may consist of one or more sub-steps or may involve specialized equipment, as known in the art. While steps 310 through 340 shown in flowchart 300 are sufficient to describe one embodiment of the present invention, other embodiments of the invention may utilize steps different from those shown in flowchart 300.

Referring to step 310 of flowchart 300 in FIG. 3 and diagram 200 of FIG. 2, step 310 of flowchart 300 comprises task scheduler 260 accessing parallel task list 216. Parallel task list 216 may be ordered to indicate priority; that is, Task1 is assigned the highest priority, whereas Task5 is assigned the lowest priority. As previously discussed and shown in FIG. 1, an API 125*a* may allow application 115 executing on upper sub-system 110 to pass parallel task list 116, corresponding to parallel task list 216, to task scheduler 160 for processing. Since input data 111 may be updated in real-time for real-time applications, processor 121 may receive a continuously updated parallel task list 116 with new tasks. After portions of parallel task list 116 are finished, task scheduler 160 may provide the results back to processor 121 for reading by application 115 via API 125*a* to fill output data 112.

Referring to step 320 of flowchart 300 in FIG. 3 and diagram 200 of FIG. 2, step 320 of flowchart 300 comprises task scheduler 260 determining data inputs for each task in parallel task list 216. Thus, by reviewing input data 211, it can be determined that Task1 has {i1, i2, i3} as data inputs, Task2 has {i4, i5, i6} as data inputs, Task3 has {i7, i8, i9} as data inputs, and Task5 has {i10, i11, i12} as data inputs. Thus, Task1, Task2, Task3, and Task5 operate on presently available or independent input data. However, this is not to imply that parallel tasks must operate on mutually exclusive sets of data. For example, Task1, Task2, Task3, and Task5 might all use the same Input1 comprising {i1, i2, i3}, which is presently available for all tasks, and still proceed with parallel processing. The term "independent input data" as used in this specification is used to refer to data that is not dependent on another process. Thus, even the same set of input data can be considered as "independent input data" as long as that input data is "independent" from another process blocking access to that input data. "Independent input data" can therefore be read as "presently available" input data, or input data that is not waiting for or locked by another process. Therefore, the term "independent input data" does not necessarily indicate that each task has mutually exclusive input data sets. Moreover, it can be determined that Task4 is dependent on the completion of Task1 to provide Output1 as an input for Task4, and this operates on dependent input data.

Referring to step 330 of flowchart 300 in FIG. 3 and diagram 200 of FIG. 2, step 330 of flowchart 300 comprises task scheduler 260 selecting a subset of tasks from parallel task list 216 based on task priorities received from step 310, wherein said subset of tasks are determined to have currently accessible data inputs from step 320. Thus, as can be seen by the states of slave processing cores 270 in FIG. 2, Task1, Task2, and Task3 are selected and assigned to their respective preferred core types as indicated in parallel task list 216. Since Task4 uses dependent input data as indicated in step 320, Task4 is deferred for future execution. Since Task5, which has a lower priority than Task2, cannot be assigned to any free idle cores from the preferred general DSPs 240, Task5 is also deferred for future execution.

As previously discussed, task scheduler 260 may override the priorities given in parallel task list 216 before proceeding with step 330 to accommodate competing system hardware requirements. For example, a buffer fill size of a portion of memory reserved as an output transmission buffer may be monitored to prevent buffer underruns, reassigning given task priorities to prioritize refilling the buffer as necessary. Tasks might also be redistributed to non-preferred core types or deferred for future execution using predictive task analysis, as previously described.

Referring to step 340 of flowchart 300 in FIG. 3 and diagram 200 of FIG. 2, step 340 of flowchart 300 comprises task scheduler 260 distributing the subset of tasks selected from step 330 to slave processing cores 270. Since the subset of tasks already indicates preferred core types, and since step 330 already reduced the subset of tasks to accommodate the number of free cores available, step 340 only needs to distribute the tasks to the proper respective free cores of slave processing cores 270.

In this manner, highly parallel execution of applications on multi-core systems can be achieved while balancing software and hardware priority requirements, which may be especially important for real-time applications having sensitive processing deadlines. Since the design of the application and the design of the adaptive task scheduler are modularized, the programmer of application 115 in FIG. 1 is freed from the burden of having to explicitly direct slave processing cores 170. Similarly, the designer of task scheduler 160 can focus on meeting the requirements of slave processing cores 170 by reassigning task priorities as needed without any specific knowledge of application 115. In this manner, application and hardware demands are automatically balanced by task scheduler 160, thereby speeding development time and allowing software and hardware teams to focus on their respective areas of proficiency to produce a higher quality result resulting in near-optimal processing of the application on the device, similar to what would be expected with traditional approach of using programmers who intimately understand and program to the custom hardware features of the device.

For example, consider the example of demodulating and decoding of Long Term Evolution (LTE) Physical Uplink Shared Channel (PUSCH) subframes. In conventional systems, a high-frequency single-core processor might be used to process LTE data streams as a single monolithic sequential task. For example, first demodulation, then descrambling, then decoding, then rate de-adaption, then Hybrid Automatic Repeat-Request (HARQ) combination, then turbo decoding, then code desplitting, then Cyclic Redundancy Check (CRC) calculation of the transport block. That is, since the output of each step is typically required as the input for the next step in the sequential task, conventional programming paradigms do not seek to exploit parallelism and require expensive single-core hardware solutions to implement LTE data processing.

However, careful analysis of the steps in the LTE data processing chain can allow conversion of the sequential task into suitable parallel tasks. For example, demodulation and descrambling can be divided based on symbol, and rate de-adaption and CRC calculation can be divided based on code block and later combined for the transport block. Data streams can be further separated based on user being serviced, as the data for one user can be processed without necessarily depending on data from another user. In this manner, the workload of LTE processing can be distributed to a massive set of parallel slave processing cores, for example comprising 20 or more DSPs. Thus, rather than being forced to use a single expensive processing device, performance can be scaled almost linearly by simply adding additional slave processing cores to the system configuration to meet system latency requirements. Moreover, by only performing some slight software optimizations in advance to place the tasks in a condition for parallelism, the system can take care of the rest of the low-level hardware optimization to provide optimal performance. While LTE processing is given as one example, this can be applied to any task traditionally viewed as a "sequential task" by dividing the task into blocks that can be distributed for parallel processing, with buffers and delays as necessary.

From the above description of the embodiments of the present invention, it is manifest that various techniques can be used for implementing the concepts of the present invention without departing from its scope. Moreover, while the present invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for an adaptive scheduler to distribute tasks for execution on a multi-core system having a plurality of slave processing cores each being one of a plurality of core types, the method comprising:

accessing a plurality of tasks each having an assigned priority and an assigned core type of said plurality of core types;

determining data inputs for each of said plurality of tasks;

selecting a subset of tasks from said plurality of tasks based on said assigned priorities, wherein data inputs of each of said subset of tasks are presently accessible;

overriding said assigned core type of at least one of said tasks in said subset of tasks to assign said at least one of said tasks to a different core type of plurality of core types than said assigned core type for said at least one of said tasks;

recognizing patterns of said plurality of tasks;

predicting particular types of additional tasks to follow, based on said patterns; and distributing said subset of tasks to said plurality of slave processing cores of said multi-core system, according to said predicting of said particular types of said additional tasks to follow, based on said patterns;

wherein said particular types of said additional tasks include processing at least one of particular data types and particular operations.

2. The method of claim 1, wherein said overriding includes translating instructions for said at least one of said tasks designed for execution on said assigned core type to be executed on said different core type.

3. The method of claim 1 further comprising, prior to said selecting, overriding one or more assigned priorities of said plurality of tasks.

4. The method of claim 3, wherein said overriding uses a state of said plurality of slave processing cores.

5. The method of claim 3, wherein said overriding uses a state of a memory of said multi-core system.

6. The method of claim 5, wherein said state of said memory comprises a buffer fill size within said memory.

7. The method of claim 3, wherein said overriding uses a state of a hardware component of said multi-core system.

8. The method of claim 1, wherein said assigned core type comprises one of a custom digital signal processor (DSP), a general DSP, and an embedded processor core.

9. The method of claim 8, wherein said overriding of said assigned core type assigns said at least one of said tasks from said embedded processor core to execute on said general DSP.

10. The method of claim 1, wherein said particular data types include floating point numbers and said particular operations include one of turbo/viterbi decoding, fast Fourier transforms (FFT/IFFT), and matrix inversion.

11. A multi-core system comprising:

a lower sub-system including an adaptive scheduler and a plurality of slave processing cores each being one of a plurality of core types, said adaptive scheduler configured to:

access a plurality of tasks each having an assigned priority and an assigned core type of said plurality of core types;

determine data inputs for each of said plurality of tasks;

select a subset of tasks from said plurality of tasks based on said assigned priorities, wherein data inputs of each of said subset of tasks are presently accessible;

override said assigned core type of at least one of said tasks in said subset of tasks to assign said at least one of said tasks to a different core type of plurality of core types than said assigned core type for said at least one of said tasks;

recognize patterns of said plurality of tasks;

predict particular types of additional tasks to follow, based on said patterns; and distribute said subset of tasks to said plurality of slave processing cores, according to predicting said particular types of said additional tasks to follow, based on said patterns;

wherein said particular types of said additional tasks include processing at least one of particular data types and particular operations.

12. The system of claim 11, wherein overriding includes translating instructions for said at least one of said tasks designed for execution on said assigned core type to be executed on said different core type.

13. The system of claim 11, wherein prior to said selecting, said adaptive scheduler is further configured to override one or more assigned priorities of said plurality of tasks.

14. The system of claim 13, wherein said adaptive scheduler is further configured to override using a state of said plurality of slave processing cores.

15. The system of claim 13, wherein said adaptive scheduler is further configured to override using a state of a memory of said multi-core system.

16. The system of claim 15, wherein said state of said memory comprises a buffer fill size within said memory.

17. The system of claim 13, wherein said adaptive scheduler is further configured to override using a state of a hardware component of said multi-core system.

18. The system of claim 11, wherein said assigned core type comprises one of a custom digital signal processor (DSP), a general DSP, and an embedded processor core.

19. The system of claim 18, wherein overriding of said assigned core type assigns said at least one of said tasks from said embedded processor core to execute on said general DSP.

20. The system of claim 11, wherein said particular data types include floating point numbers and said particular operations include one of turbo/viterbi decoding, fast Fourier transforms (FFT/IFFT), and matrix inversion.

* * * * *